July 10, 1962  A. L. NIELSEN  3,043,225
ADJUSTABLE LIQUID LEVEL CONTROL FOR PUMPS
Filed Aug. 10, 1959  3 Sheets-Sheet 1
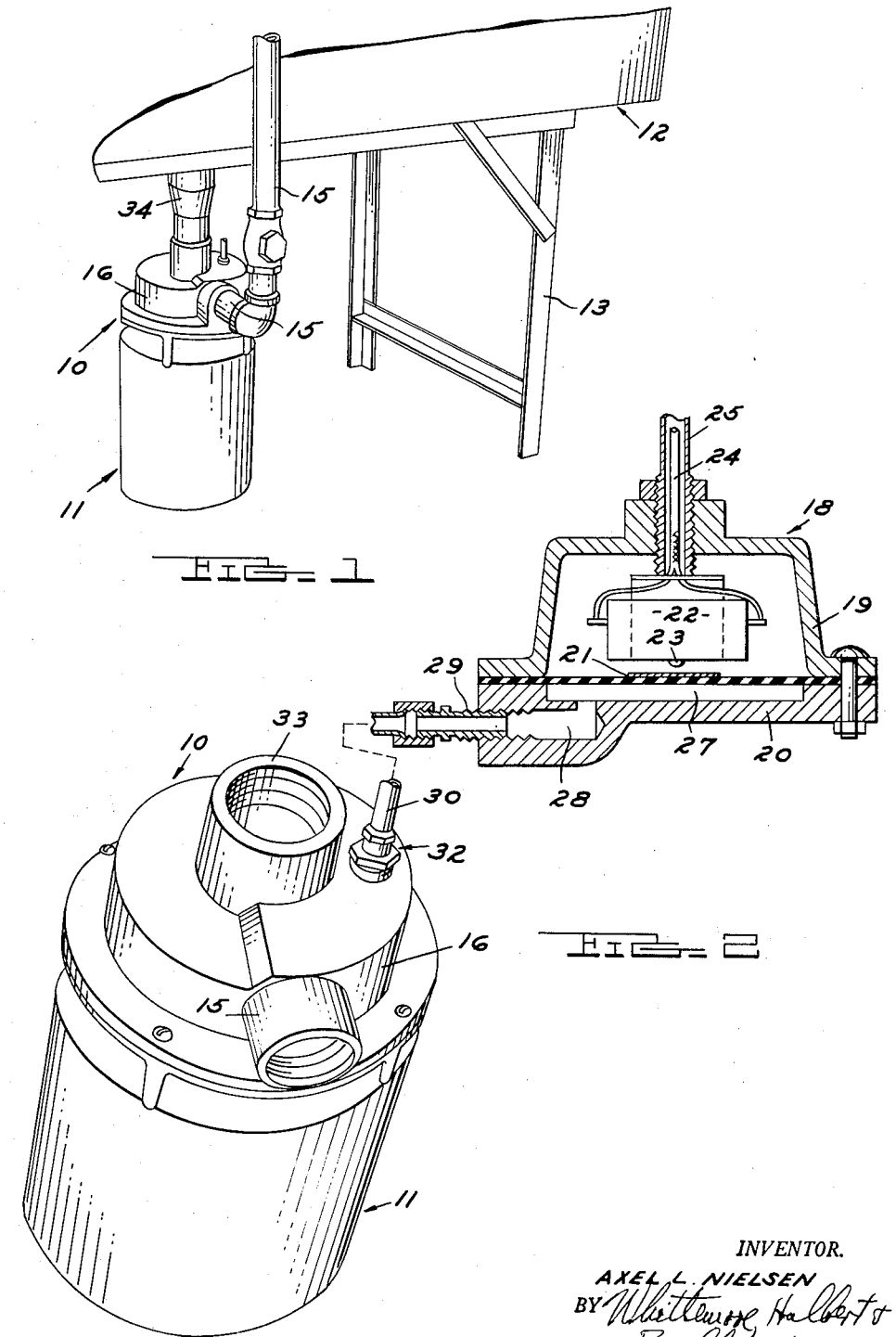
INVENTOR.
AXEL L. NIELSEN
BY
ATTORNEYS

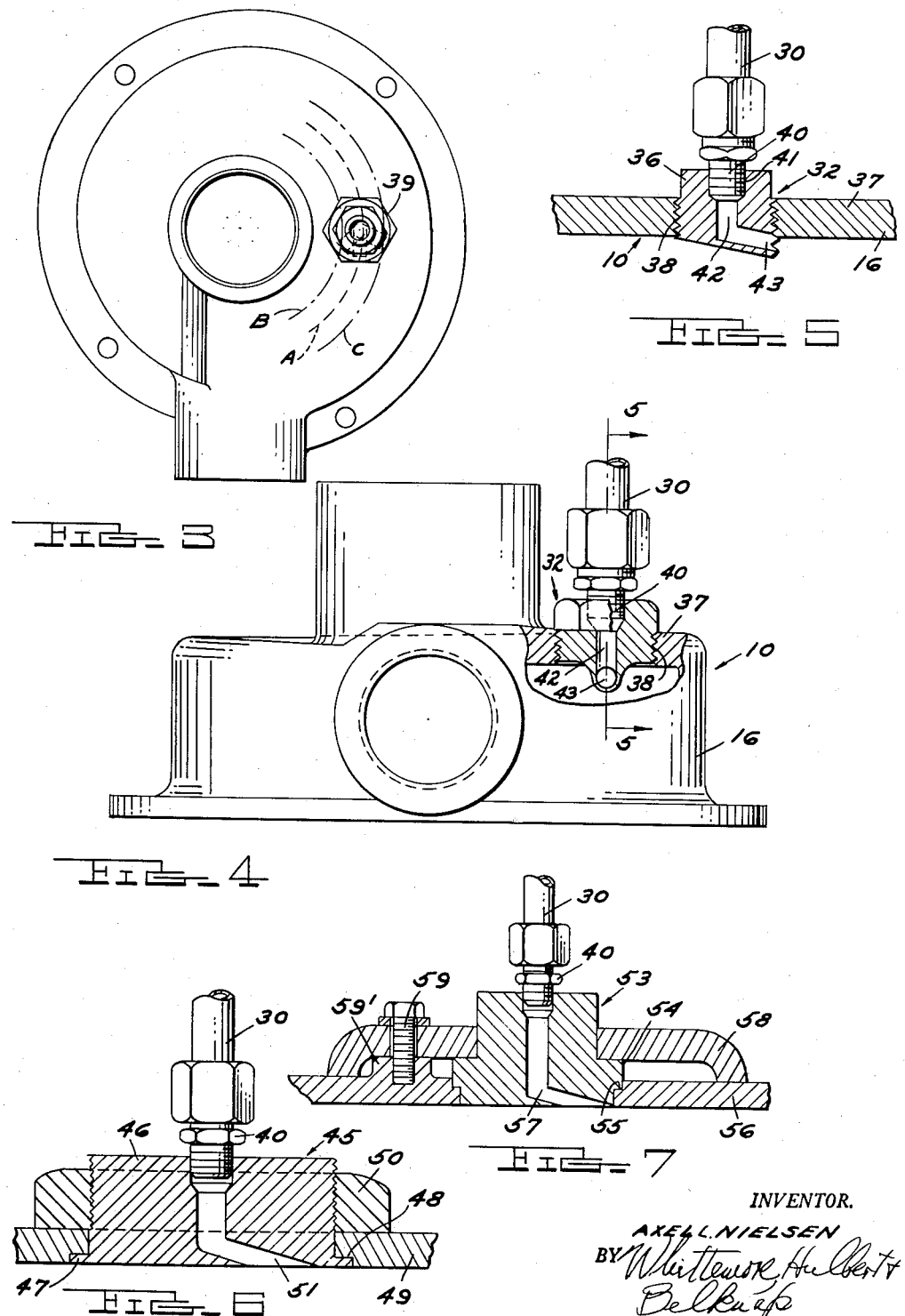

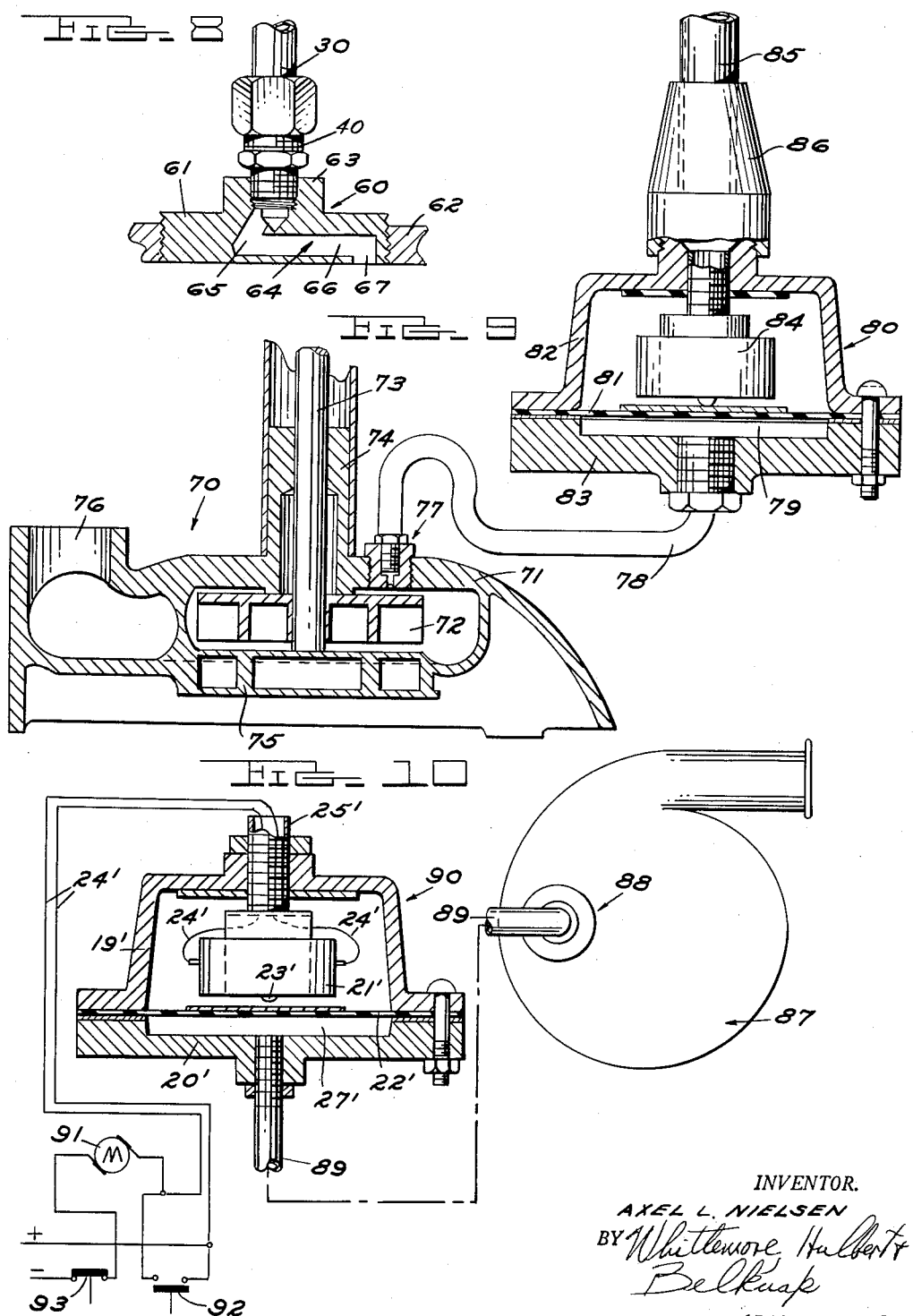

United States Patent Office 3,043,225
Patented July 10, 1962

3,043,225
ADJUSTABLE LIQUID LEVEL CONTROL
FOR PUMPS
Axel L. Nielsen, 1316 E. Elza, Hazel Park, Mich.
Filed Aug. 10, 1959, Ser. No. 832,620
5 Claims. (Cl. 103—25)

The present invention relates to improvements in a pump control device or system which is of the general type illustrated and described in my Letters Patent No. 2,834,845, of May 13, 1958. The control which is the subject matter of that patent is one in which a liquid level, as in a sump, is controlled, as regards commencement and termination of the action of a pump to discharge liquid from the sump, under the combined effects of hydrostatic pressure of liquid therein and vacuum at the pump intake, once pumping has proceeded for a predetermined interval sufficient to predeterminedly lower the liquid level.

The action of the present pump control is also in response to initial hydrostatic pressure at the pump intake, coupled to some extent with hydrodynamic or discharge pressure of the pump once pumping has commenced, and vacuum in the pump housing as pumping proceeds to a point at which it is desired to terminate pump action. Although reference has been made above, in regard to my patent, to a control for a sump pump, it is to be understood that the present improvements are in no wise limited in respect to the application of the control, and that it may, with minor modifications, be applied for the evacuation of a sump, any other liquid receptacle, such as a laundry wash tub, in general field use, heavy duty or otherwise, as for flood drainage, and the like, and in many yet further settings as to which the practicality of the improved control will suggest itself to those skilled in the art.

It is an object of the present invention to provide a pump or liquid level control unit or system which embodies a suitable pressure responsive device, such as a diaphragm mechanism adapted to control a suitable pump motor switch, which pressure responsive device is in communication with the impeller housing or casing of the pump through the agency of an improved adjustable liquid intake structure. The adjustability of such structure enables a setting of the control such that pump operation will be commenced under a predetermined hydrostatic pressure effective through the intake and connecting line to the diaphragm device, and such that pumping will be continued for any desired length of time, depending upon hydraulic head at the pump intake and discharge head to be overcome, until the level of liquid has been reduced to the desired extent. At such time, comparatively negative pressure or vacuum existing in the pump housing or casing will become effective on the diaphragm of the device to instantaneously de-energize the pump motor.

More specifically, it is an object of the invention to provide an adjustable liquid level control for pumps, wherein a connecting line leading to a diaphragm device of the type described opens to the pump impeller housing or casing at a predetermined radial distance from the rotative axis and eye of the pump impeller, this distance being selectively variable by reason of the use of an improved intake device for the connecting line at its connection to the impeller housing.

In further accordance with the invention, the connecting or intake device to the pressure responsive diaphragm device from the pump housing takes the form of a suitable plug of one sort or another which is received for rotative adjustment in a wall (top or bottom) of the housing, in a predetermined radial spacing outwardly of the axis of rotation of the housing, and of the axial eye of the pump impeller. Tubing connecting the pressure responsive device with the connector in question is disposed, externally of the connector and pump housing, in concentric relation to the plug, but the plug has a passage which extends from a point of communication with such tubing to a position eccentric of the rotatively adjustable axis of the plug, at which position the passage communicates with the interior of the pump housing. Thus, it is seen that, in accordance with the rotative adjustment of the plug, the degree of eccentricity of the internal passage opening may be varied, correspondingly varying the radial distance of the opening from the impeller axis.

Since, in the case of any pump housing and impeller, such as of the centrifugal type commonly employed in pumps of the sort under consideration, there is an annular zone about the impeller axis at which the pressure existing within the housing changes from positive to negative, the radial spacing of this zone from the impeller axis varying in accordance with pumping condition as to make and discharged head, it is seen that the adjustment of the eccentric plug intake enables a selection to be had as to exactly at what point in the dropping of the liquid level being pump that pumping shall be terminated; or, in other words, at exactly what point, as the pressure condition within the pump housing drops from positive to or toward negative, the negative shall prevail in the control of the pressure responsive diaphragm or like device, which in turn controls the action of the pump through the electrical circuit to its motor.

It is further specific object of the invention to provide a control incorporating an adjustable pressure inlet in the pump housing, wherein the provisions for producing the eccentricity of the intake passage from the housing may be of various types. In accordance with certain embodiments, the opening is in a plane flush with the inner surface of the wall in which the plug is received; while in another form, the plug brings the opening in question into the pumping chamber slightly, with tendency to augment the vacuum effect, in an aspirative way, as well as to influence the effect of discharge pressure. In certain embodiments, the plug is fitted to the pump housing wall by a threaded connection, with adjustment of the intake opening accompanying rotative movement of the plug at the connection; while in another embodiment, the plug may be mounted at a simple circular pilot seat in the housing wall, and held in place by an external clamp or like member.

Generally, it is an object to provide a control as described, in which a radial zone of pressure changeover can always be located, this zone being what might be termed a neutral zone between a more positive zone radially outwardly thereof and a more negative zone radially inwardly thereof. It is at this zone that it is desirable to have pumping action terminated by the application of the more negative pressure to the diaphragm of the pressure responsive device. Hence, once the neutral zone is ascertained under the particular conditions of pressure head on the intake of the pump and head against which liquid must be pumped, the intake fitting plug may be rotatably adjusted on the pump housing to bring its eccentric passage into coincidence with the ascertained neutral zone to obtain the desired and insured vacuum cutoff point for the pressure sensitive diaphragm.

The foregoing as well as other objects will become more apparent as this description proceeds, especially when considered in connection with the accompanying drawings illustrating a preferred embodiment of the invention, wherein:

FIG. 1 is a fragmentary perspective view illustrating one type of installation of the pump to which the improved adjustable liquid control feature is adapted;

FIG. 2 is a fragmentary view, in part in perspective as regards the pump unit, and in part in vertical cross section as regards a pressure sensitive device such as that shown in my Letters Patent identified above;

FIG. 3 is a top plan view of the pump housing of the installation of FIGS. 1 and 2, showing the radially offset position of an intake plug or fitting thereon, and indicating in dotted and a dot-dash line the effect of the selective positioning of the plug or fitting, in accordance with the principle of the invention;

FIG. 4 is a fragmentary view in end elevation, partially broken away and in vertical section, to further illustrate details of the improved adjustable plug feature;

FIG. 5 is a fragmentary view in vertical section along line 5—5 of FIG. 4;

FIGS. 6, 7 and 8 are fragmentary views in section similar to FIG. 5 illustrating further modified embodiments of adjustable intake connector contemplated by the invention;

FIG. 9 is a fragmentary view of a combined pump and pressure sensitive unit, in a modified adaptation of the latter enabling it to be immersed in the liquid pumped; and FIG. 10 shows a typical heavy-duty pump, suitable for field operation, as operatively connected with a pressure sensitive diaphragm unit or device intended to be mounted above the liquid level, this view also schematically illustrating a suggested electrical control circuit for a motor which operates the pump.

FIGS. 1 and 2 of the drawings illustrate a typical installation of a pump 10 having an impeller (not shown) driven by a suitable motor unit 11, as by a direct drive connection of the motor to the impeller shaft. The installation in question is for the drainage of an ordinary laundry tub 12 mounted on a suitable supporting structure 13. However, as will be appreciated by those skilled in the art, the intake of the pump unit 10 might as well be connected to any other source or accumulation of liquid to be pumped, such as by immersion of the pump 10 in a liquid collecting sump, by connection of the intake of the pump to a flooded terrain to be drained, etc. It is to be understood that details of the pump itself, the motor drive 11 therefor, and the like, constitute no part of the present invention. A discharge line 15 connects in a usual manner with the casing or housing 16 of pump 10, and through this line liquid is discharged under pressure, upwardly as shown in FIG. 1, to a suitable disposal point (not shown).

The reference numeral 18 in FIG. 2 generally designates a pressure responsive diaphragm type control device, such as is illustrated and described in my above identified patent. The device 18 is constituted by an upper, bonnet-like casing member 19, a lower casing member 20, a suitable flexible diaphragm 21 clamped between these members in a conventional way, and a normally open switch 22 which is adapted to be engaged and closed when a pressure plate 21' on diaphragm 21 is engaged against the control button 23 of the switch, under the conditions encountered in pumping, to be described. Leads 24 from the switch extend upwardly through a tubular shield 25, and are wired in a conventional manner to the motor 11 to control the operation of the latter, and of the pump 10.

The bottom casing member 20 of the diaphragm unit 18 is formed to provide a pressure chamber 27 beneath the diaphragm 21, with which chamber a passage 28 in the lower casing member 20 communicates. In turn, a tubular fitting 29 applied to the casing member 20 communicates with a tube or conduit 30 of suitable length; and hydrostatic pressure, hydrodynamic or discharge pressure, or negative pressure are applied through conduit 30 and space 28 to the chamber 27 of unit 18 through the agency of the improved intake connector or plug of the present invention, which is generally designated by the reference numeral 32.

It is with the connector 32, and its adjustable positional relationship to the housing 16 of pump unit 10, that the present invention relates and, other than the fact that the pump 10 is of the rotative impeller type having an intake opening 33 adapted to be connected by an adapter 34 (FIG. 1) with the collector or receiver 12 to be pumped, which opening 33 is coaxial with the intake eye of the impeller (not shown), the other details of the pump 10, its motor drive 11, and structural details of the pressure sensitive diaphragm unit are not of the essence of the invention; although it is considered that the general combination of the adjustable intake device 32 with the pump and unit 18 is a basically new one in respect to the improved optional control of the unit 18, as determined by conditions within the pump housing 16 and the corresponding orientation of the connector or plug device 32.

Now referring to FIGS. 3, 4 and 5, in the last of which the connector or plug 32 is shown in one of several proposed alternative embodiments, the plug 32 comprises a body 36 of circular cross section in the horizontal plane of the top wall 37 of top housing 16; and it has threaded engagement at 38 with a tapped bore in the wall 37. Plug body 36 extends upwardly above the wall 16, where it is provided with a hex formation 39 to receive a wrench or like tool for the rotative adjustment of the plug 32 in accordance with the intent of the invention.

The connecting conduit, pipe or tube 30 is applied by means of a suitable fitting 40, coaxially of a top counterbore 41 of the plug, and a passage 42 is formed in the plug in communication with the fitting 40. Passage 42 extends, in the embodiment under consideration, coaxially of the fitting for a short distance, and is then angled radially outwardly and downwardly at 43, where it opens to the interior of the impeller housing 16 somewhat beneath the top wall 37 of the latter. This formation and disposition of the plug body 36 to bring the intake passage 43 within the actual space of the impeller housing has the effect of modifying somewhat the action of the plug 32, as compared with other adaptations to be described, in that there is an accentuation of the effect of hydrodynamic or discharge pressure to the conduit 30 and pressure chamber 27 of unit 18, as well as an accentuation of the negative pressure or vacuum effect. However, in general, the action and advantages of the plug 32 in the embodiment of FIGS. 4 and 5 are identical with those of the plugs of alternative modifications to be described.

The plug 32 is shown in what may be described as a central or intermediate setting of its passage 43, i.e., about half way between two alternative optional settings which are shown in dot-dash line in FIG. 3. As centrally disposed, the mouth of the passage 43 lies on an arc A shown in dotted line in FIG. 3 which is at an intermediate radius from the axis of the impeller and the eye of the pump. This position, for illustrative purpose, may be considered to be the desired one for the operation of the pressure sensitive device 18 when the pump is operating against a discharge head of, say, 25 pounds per square inch, with a vacuum of, say, 20 inches Hg at its intake.

On the other hand, with the intake passage 43 disposed somewhat radially inwardly (and the extent is considerably exaggerated in FIG. 3, since only a slight relative adjustment of the plug in either direction will ordinarily be called for), the mouth of the passage 43 lies on an arc B whose radius from the axis is less than that of the arc A; and when the plug is oppositely adjusted to the arc C at a greater radial distance from the axis than the arc A, another setting is present to accommodate a different set of pumping conditions. Thus, it may be considered that the setting represented by arc B will be one for use when the discharge head amounts to, say, 40 pounds per square inch, with a 10 inch Hg vacuum at the intake; while the setting represented by arc C will best handle a 20 pounds per square inch head pumped against, and a vacuum of 20 inches Hg.

It is to be understood that the settings of the plug 32 with its passage 43 disposed as illustrated in dotted and in dot-dash line in FIG. 3, will be in an extreme and exaggerated position in either of the two dot-dash line settings. That is, the adjustment of the plug to accommodate any pumping condition to be encountered, as a practical matter, will be in a much slighter angular degree, than the range between the two adjustments represented by dot-dash line arcs B and C.

In any event, a dynamic pressure gradient is present in the pump housing, ranging from a suction condition at the intake opening 33 to a predetermined dynamic pressure condition at the discharge opening to line 15, including a radial zone intermediate the intake and discharge which, in any given design of pump, will, depending upon the operating conditions to be encountered, be at substantially zero pressure, i.e., in the approximate zone at which housing pressure changes from positive to negative as pumping proceeds.

FIGS. 6, 7 and 8 illustrate three possible alternatives contemplated by the invention in regard to the nature of the adjustable plug of the structure. Thus, FIG. 6 illustrates a rotative plug 45 having a body 46 which has an annular flange 47 adapted to seat upwardly against a circular seat 48 formed in the top wall 49 of the impeller housing. Body 46 is inserted into the opening defined by the seat 48, with its inner surface flush with the inner surface of the housing 49; and a nut 50 is threadedly applied to the body 46 on the ouside of housing 49. The nut 50 may be loosened for the desired rotative adjustment of plug 45, then taken up to lock the plug in place, with the intake passage 51 of the plug opening eccentrically of the plug axis, and flush with the inner surface of housing 49.

FIG. 7 illustrates an alternative adaptation, featuring a plug 53 having an annular flange 54 and adapted to be inserted from the top of the housing, with the flange 54 abutting an annular counterbored seat 55 in the housing wall 56, the intake passage 57 opening flush with the inner surface of wall 56, as in the embodiment of FIG. 6. A suitable retainer ring 58 is telescoped over plug 53 above its flange 54 to hold the plug in place, the ring 58 being clamped to the top of housing wall 56, as by a plurality of bolts or studs 59 threadedly engaging in bosses 59' on the top of the casing or housing wall.

The embodiment of connector plug 60 which is shown in FIG. 8 is similar to that of FIGS. 4 and 5, the body 61 of the plug threadedly engaging the top housing wall 62, and being provided with a hex formation 63 to facilitate adjustment. However, in this adaptation, the intake passage, generally designated 64, includes a passage portion 65 inclining downwardly from the plug axis, a horizontal passage portion 66 opening to the portion 65, and a mouth 67 to the housing exterior which is at 90° to the horizontal passage portion 66.

FIG. 9 of the drawings illustrates an embodiment of the invention as incorporated in a conventional type of sump pump. The reference numeral 70 generally designates a sump pump having an impeller housing 71 within which a conventional centrifugal impeller 72 operates, being driven by a motor operated shaft 73 appropriately journaled in a center top extension 74 of housing 71 and, at the bottom of the shaft, in the usual pump trap 75. Impeller 72 discharges through a discharge fitting 76 to any suitable type of discharge line.

The intake connector or plug of this embodiment is generally designated by the reference numeral 77, and it is to be understood that this plug may be optionally of any of the types illustrated in FIGS. 4 through 8. It connects through a tube or conduit 78 with the pressure chamber 79 of a pressure responsive diaphragm device, generally designated 80, including a flexible diaphragm 81 clamped between housing members 82, 83, and a suitable normally open switch 84.

Operation of switch 84 of device 80 is in all respects as described in connection with the preceding figures, under varying hydrostatic, hydrodynamic and vacuum effects, as controlled by the adjustable positioning of the plug 77. However, since it is contemplated that the diaphragm device 80 be immersed within a sump or like liquid collector, the connection of its shielding tube or conduit 85 to the housing is protected by means of a sealing sleeve 86 threadedly applied to the top of housing member 82, in sealed relation to the latter and to the tube 85.

FIG. 10 of the drawings further illustrates an alternative application of the principle of the invention, as to a heavy duty, centrifugal type pump 87, the plug or connector being designated generally by the reference numeral 88 and being connected by a tube or conduit 89 with the pressure sensitive device, here generally designated 90. This device is in all essential respects identical to the device 18 of FIG. 2; accordingly, corresponding parts are designated by corresponding reference numerals, primed, and further description thereof may be dispensed with.

FIG. 10 also illustrates a typical wiring hook-up of the normally open switch 21' with a motor 91 for the impeller of pump 87. The leads 24' are connected with the terminals of motor 91, preferably through the agency of a normally open starting switch 92 and a normally closed stop switch 93, in a fashion which will be evident to those skilled in the art.

In a heavy duty installation such as is shown in FIG. 10, it is imperative that a reliable control of the operation of motor 91 be had to unfailingly terminate drive of the pump by motor 91 as the pump approaches a condition of running dry, for if this is not done serious damage to the pump and motor may well result. As governed by the desired setting of plug 88 to suit the pumping conditions, the structure of the invention insures termination of pump operation before a dangerous condition is reached.

It is seen that the invention affords a highly simple and effective means for the control of a pump whereby the latter is made responsive to any encountered condition of intake or discharge head. Instantaneous vacuum-responsive control of the pressure sensitive diaphragm device is had.

The foregoing descriptions of the invention in its several embodiments are characterized in common by the fact that a connector elements is employed which is adjustable to vary the radial distance of an intake passage, which leads from the impeller housing to the pressure sensitive device, from the axis of the impeller; and these adaptations have special advantages when it is desired to make what may be called a custom adjustment of the control for differing types of pump and pumping conditions.

However, it is to be understood that the principles of the invention are also applicable without requiring a separate adjustment of a plug or connector element. That is, on the assumption that a pump manufacturer knows the nearly exact elevation to which the pump is to discharge, and also knows the nearly exact liquid level to be pumped, and that these respective values will remain respectively constant, it is possible for him to select a radial spacing of intake passage from impeller axis or eye which will unfailingly produce the desired pump cutoff at a desired zone of pressure changeover in the housing. Therefore, it is to be understood that, unless otherwise limited, the claims of this application are to be construed as sufficiently broad to cover the invention as thus carried into effect.

What I claim as my invention is:

1. A rotary pump control system comprising a pump impeller housing rotatively mounting an impeller, said housing having a liquid intake opening substantially coaxial with said impeller and a discharge opening radially outwardly of the impeller axis, there being a dynamic pressure gradient in said housing ranging from a suction condition at said intake opening to a predetermined dynamic pressure condition at said discharge opening, including a radial zone intermediate thereof at substantially zero pressure, a motor connected to said impeller to drive the same and provided with control means responsive first to hydrostatic pressure to initiate operation of the motor and then to hydrodynamic pressure to continue the motor operation for a predetermined interval, and means including a single conduit providing a closed fluid pressure connection with the interior of said housing to transmit hydrostatic and hydrodynamic pressures effective therein to said control means to operate the latter, said conduit opening to said housing radially outwardly of the axis of said impeller and maintaining the application of said operating pressure on said control means notwithstanding a drop of hydrostatic pressure in said housing, said conduit opening to said housing in said radial zone, thus to locate the conduit opening at the approximate point relative to said impeller axis at which pressure in the housing changes from positive to negative as pumping by the impeller proceeds.

2. A rotary pump control system in accordance with claim 1, and further comprising means to adjust the position at which said conduit opens to the housing interior radially relative to the impeller axis, thus to variably embrace said zero pressure zone.

3. A rotary pump control system in accordance with claim 1, and further comprising means to adjust the position at which said conduit opens in the housing interior radially relative to the impeller axis, thus to variably embrace said zero pressure zone, said adjusting means comprising a member rotatably adjustable on the impeller housing and having an eccentric port communicating said conduit with the housing interior variably in accordance with the rotative adjustment of said member.

4. A rotary pump control system comprising a pump impeller housing rotatively mounting an impeller, said housing having a liquid intake opening substantially coaxial with said impeller and a discharge opening radially outwardly of said impeller axis, a motor connected to said impeller to drive the same and provided with control means responsive first to hydrostatic pressure to initiate operation of the motor and then to hydrodynamic pressure to continue the motor operation for a predetermined interval, and means including a single conduit providing a closed fluid pressure connection with the interior of said housing to transmit pressure effective therein to said control means to operate the latter, said fluid pressure connection means further comprising a member connected to said conduit and having an eccentric port opening to said housing outwardly of the axis of rotation of said impeller, said connecting means maintaining the application of operating pressure on said control means notwithstanding a drop of hydrostatic pressure in said housing, said member being rotatably adjustable on said housing to vary the relationship of said port in reference to the impeller axis as determined by said adjustment.

5. A rotary pump control system in accordance with claim 4, in which said port opens to said housing in an annular zone concentric with the impeller axis and at a radial distance therefrom to locate the port opening at the approximate point relative to said impeller axis at which pressure in the housing changes from positive to negative as pumping by the impeller proceeds.

References Cited in the file of this patent
UNITED STATES PATENTS

| | | |
|---|---|---|
| 1,162,373 | Kiefer | Nov. 30, 1915 |
| 1,419,316 | Sherbondy | June 13, 1922 |
| 2,269,009 | Corbin | Jan. 6, 1942 |
| 2,407,139 | Clothier et al. | Sept. 3, 1946 |
| 2,488,506 | Bernhardt | Nov. 15, 1949 |
| 2,775,205 | Gunther | Dec. 25, 1956 |
| 2,804,516 | Staak | Aug. 27, 1957 |
| 2,834,845 | Nielsen | May 13, 1958 |
| 2,945,446 | Mason et al. | July 19, 1960 |